(12) United States Patent
Takahashi

(10) Patent No.: US 6,632,500 B1
(45) Date of Patent: Oct. 14, 2003

(54) LAMINATED DISC AND INFORMATION RECORDING DISC

(75) Inventor: Haruhiko Takahashi, Kawasaki (JP)

(73) Assignee: Zeon Corporation, Tokyo (JP)

( * ) Notice: Subject to any disclaimer, the term of this patent is extended or adjusted under 35 U.S.C. 154(b) by 26 days.

(21) Appl. No.: 09/671,310

(22) Filed: Sep. 28, 2000

(30) Foreign Application Priority Data

Sep. 29, 1999 (JP) ............................................ 11-275871

(51) Int. Cl.⁷ ............................... B32B 3/02; B32B 9/04
(52) U.S. Cl. .................... 428/64.1; 428/64.2; 428/64.4; 428/65.2; 428/411.1
(58) Field of Search ............................... 428/64.2, 64.4, 428/65.2, 64.1, 411.1

(56) References Cited

U.S. PATENT DOCUMENTS

| | | | | |
|---|---|---|---|---|
| 4,911,966 A | * | 3/1990 | Murayama et al. | ............ 428/64 |
| 5,290,877 A | * | 3/1994 | Yamaoka et al. | ......... 525/329.5 |
| 5,448,547 A | * | 9/1995 | Minoda et al. | ............. 369/280 |

* cited by examiner

*Primary Examiner*—Cynthia H. Kelly
*Assistant Examiner*—L Ferguson
(74) *Attorney, Agent, or Firm*—Armstrong, Westerman & Hattori, LLP

(57) ABSTRACT

A laminated disc composed of at least two supporting discs superposed upon another, each of the supporting discs having a thickness of 0.01 to 1 mm and being made of a vinyl alicyclic hydrocarbon polymer. This laminated disc is used as an optical disc including digital video disc (DVD).

15 Claims, No Drawings

LAMINATED DISC AND INFORMATION RECORDING DISC

BACKGROUND OF THE INVENTION

(1) Field of the Invention

This invention relates to a laminated disc composed of supporting discs superposed upon another, made of a vinyl alicyclic hydrocarbon polymer, and to an optical information recording medium comprising the laminated disc.

(2) Description of the Related Art

Polycarbonate is known as a molding material for disc-form information recording medium including a compact disc.

As a molding material suitable for a high-density high-capacity recording medium, a polymer containing at least 30% by weight of a vinylcyclohexane ingredient in the molecule chain has been proposed, for example, in Japanese Unexamined Patent Publication No. S63-43910. It is reported that a compact disc molded from this polymer by injection molding has a greatly reduced birefringence.

However, according the study of the present inventor, the vinylcyclohexane-containing polymer has poor mechanical strengths and abrasion resistance, as compared with polycarbonate, and thus, a problem arises when a disc made therefrom is subjected to high-speed revolution. An attempt of enhancing the mechanical strengths of a disc has been made by carrying out the injection molding at a high injection rate and thus give an orientation in the molded disc. However, the birefringence became large and the mechanical strengths were not enhanced to the desired extent. Further, the vinylcyclohexane-containing polymer has a problem such that, when a recording film and a protective film were formed on one surface of a single plate disc of the polymer, the resulting disc-form recording medium easily warps due to moisture absorption.

SUMMARY OF THE INVENTION

In view of the foregoing, a primary object of the invention is to provide a laminated disc and an information recording medium, which have reduced birefringence and good abrasion resistance, and do not warp to any significant degree.

The present inventor made extensive research, and found that the above-object of the invention can be achieved by a laminated disc composed of supporting discs having a specific thickness and made of vinyl alicyclic hydrocarbon polymer, which is prepared by hydrogenation of a vinyl aromatic hydrocarbon polymer such as polystyrene.

Thus, in accordance with the present invention, there is provided a laminated disc composed of at least two supporting discs superposed upon another; each supporting disc having a thickness of 0.01 to 1 mm and being made of a vinyl alicyclic hydrocarbon polymer.

In accordance with the present invention, there is further provided an information recording medium comprising the above-mentioned laminated disc.

Preferably, each supporting disc has a recording layer on a surface thereof.

DETAILED DESCRIPTION OF THE PREFERRED EMBODIMENTS

Vinyl Alicyclic Hydrocarbon Polymer

The laminated disc of the invention is made from a vinyl alicyclic hydrocarbon polymer, which preferably comprises repeating units represented by the following formula (1):

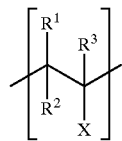

(1)

wherein X is an alicyclic hydrocarbon group; and $R^1$, $R^2$ and $R^3$ independently represent (i) a hydrogen atom, (ii) a chainlike hydrocarbon group, (iii) a group selected from a halogen atom, an alkoxy group having 1 to 6 carbon atoms, a hydroxyl group, an ester group, a cyano group, an amide group, an imide group, a silyl group, or (iv) a chainlike hydrocarbon group having a polar group which is selected from a halogen atom, an alkoxy group having 1 to 6 carbon atoms, a hydroxyl group, an ester group, a cyano group, an amide group, an imide group and a silyl group.

The alicyclic hydrocarbon group for "X" usually has 4 to 20 carbon atoms, preferably 4 to 10 carbon atoms and more preferably 5 to 7 carbon atoms in view of the reduced birefringence and mechanical strengths.

The alicyclic hydrocarbon group for "X" may have carbon-carbon unsaturation, but, the content of carbon-carbon unsaturation is not larger than 20%, preferably not larger than 10% and more preferably not larger than 5% based on the total carbon-carbon bonds in the alicyclic hydrocarbon group in view of the reduced birefringence, heat resistance and transparency. The content of carbon-carbon unsaturation can be determined by $^1$H-NMR measurement.

The alicyclic hydrocarbon group for "X" may have a substituent, which is (1) a hydrocarbon group, (2) a polar group selected from a halogen atom, an alkoxy group having 1 to 6 carbon atoms, a hydroxyl group, an ester group, a cyano group, an amide group, an imide group and a silyl group, or (3) chainlike hydrocarbon group having a substitutent selected from a halogen atom, an alkoxy group having 1 to 6 carbon atoms, a hydroxyl group, an ester group, a cyano group, an amide group, an imide group and a silyl group. Of these substituents (1), (2) and (3), a chainlike hydrocarbon group having 1 to 6 carbon atoms as hydrocarbon group (1) is preferable in view of the heat resistance.

$R^1$, $R^2$ and $R^3$ independently represent (i) a hydrogen atom, (ii) a chainlike hydrocarbon group, (iii) a group selected from a halogen atom, an alkoxy group having 1 to 6 carbon atoms, a hydroxyl group, an aster group, a cyano group, an amide group, an imide group, a silyl group, or (iv) a chainlike hydrocarbon group having a polar group which is selected from a halogen atom, an alkoxy group having 1 to 6 carbon atoms, a hydroxyl group, an ester group, a cyano group, an amide group, an imide group and a silyl group.

As examples of the chainlike hydrocarbon group (ii), there can be mentioned alkyl groups having 1 to 20 carbon atoms, preferably 1 to 10 carbon atoms and more preferably 1 to 6 carbon atoms, and alkenyl groups having 2 to 20 carbon atoms, preferably 2 to 10 carbon atoms and more preferably 2 to 6 carbon atoms.

As examples of the chainlike hydrocarbon group (iv) having a substituent comprising a polar group, there can be mentioned alkyl groups having 1 to 20 carbon atoms, preferably 1 to 10 carbon atoms and more preferably 1 to 6 carbon atoms.

$R^1$, $R^2$ and $R^3$ are preferably selected from a hydrogen atom and a chainlike hydrocarbon group having 1 to 6 carbon atoms in view of the heat resistance, reduced birefringence and mechanical strengths.

The vinyl alicyclic hydrocarbon polymer contains the repeating unit represented by the formula (1) in an amount of usually at least 50% by weight, preferably at least 70% by weight, more preferably at least 80% by weight and most preferably at least 90% by weight.

The vinyl alicyclic hydrocarbon polymer has a weight average molecular weight (Mw), as measured by gel permeation chromatography (GPC) and expressed in terms of polystyrene, of usually 10,000 to 1,000,000, preferably 50,000 to 500,000 and more preferably 100,000 to 300,000, and has a molecular weight distribution, as expressed by the ratio (Mw/Mn) of weight average molecular weight (Mw) to number average molecular weight (Mn), which are measured by GPC and expressed in terms of polystyrene, of usually not larger than 5, preferably not larger than 3, more preferably not larger than 2.5 and most preferably not larger than 2. When the ratio (Mw/Mn) is within the above-specified range, the polymer exhibits good mechanical strengths and heat resistance. When the weight average molecular weight (Mw) is within the above-specified range, the polymer exhibits good and balanced mechanical strengths, moldability and birefringence.

The vinyl alicyclic hydrocarbon polymer usually has a glass transition temperature (Tg) of 50° C. to 250° C., preferably 70° C. to 200° C. and more preferably 90° C. to 180° C.

The vinyl alicyclic hydrocarbon polymer can be produced by (A) a process of polymerizing a vinyl aromatic compound, and then, hydrogenating the aromatic ring of the resultant vinyl aromatic polymer, or (B) a process of polymerizing a vinyl alicyclic hydrocarbon such as a vinylcycloalkane or a vinylcycloalkene, and then, when the resultant polymer has a carbon-carbon unsaturation, hydrogenating the carbon-carbon unsaturation of the polymer.

The vinyl aromatic compounds used in the production process (A) include styrene and substituted styrenes, and, as specific examples thereof, there can be mentioned styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene, monofluorostyrene and 4-phenylstyrene.

As specific examples of the vinyl alicyclic hydrocarbon compounds used in the production process (A), there can be mentioned vinylcyclohexanes such as vinylcyclohexane and 3-methylisopropenylcyclohexane; and vinylcyolohexenes such as 4-vinylcyclohexene, 4-isopropenylcyclohexene, 1-methyl-4-vinylcyclohexene, 1-methyl-4-isopropenylcyclohexene, 2-methyl-4-vinylcyclohexene and 2-methyl-4-1-isopropenyl-cyclohexene.

The vinyl alicyclic hydrocarbon polymer used in the invention may comprises units of other copolymerizable monomers provided that the amount thereof is not larger than 50% by weight based on the weight of the polymer. As specific examples of the copolymerizable monomers, there can be mentioned α-olefin monomers such as ethylene, propylene, iosbutene, 2-methyl-1-butene, 2-methyl-1-pentene and 4-methyl-1-pentene; cyclopentadiene monomers such as cyclopentadiene, 1-methylcyclopentadiene, 2-methylcyclopentadiene, 2-ethylcyclopentadiene, 5-methylcyclopentadiene and 5,5-dimethylcyclopentadiene; conjugated diene monomers butadiene, isoprene, 1,3-pentadiene, furan, thiophene and 1,3-cyclohexene; nitrile monomers such as acrylonitrile, methacrylonitrile and α-chloroacrylonitrile; methacrylic acid ester monomers such as methyl methacrylate, ethyl methacrylate, propyl methacrylate and butyl methacrylate; acrylic acid ester monomers such as methyl acrylate, ethyl acrylate, propyl acrylate and butyl acrylate; unsaturated fatty acid monomers and their anhydrides such as acrylic acid, methacrylic acid and maleic anhydride, phenylmaleimide; cyclic ether monomers such as ethylene oxide, propylene oxide, trimethylene oxide, trioxane, dioxane, cyclohexene oxide, styrene oxide, epichlorohydrin and tetrahydrofuran; and heterocyclic ring-containing vinyl monomers such as methyl vinyl ether, N-vinylcarbazole and N-vinyl-2-pyrolidone.

The monomers used in the processes (A) and (B) usually contain at least 50% by weight, preferably at least 70% by weight and more preferably at least 80% by weight, of the vinyl aromatic compound and the vinyl alicyclic hydrocarbon, respectively, based on the total weight of the monomers, in view of high heat resistance, reduced birefringence and high mechanical strength.

The polymerization of a vinyl aromatic compound for the preparation of a vinyl aromatic polymer in the production process (A), and the polymerization of a vinyl alicyclic hydrocarbon for the preparation of a vinyl alicyclic hydrocarbon polymer in the production process (B) may be carried out by a conventional procedure. The polymerization procedure employed includes, for example, bulk polymerization, emulsion polymerization, suspension polymerization and solution polymerization.

The catalyst used may be conventional and includes for example, a free-radical polymerization catalyst, an anion polymerization catalyst, an anion living polymerization catalyst, a cation polymerization catalyst and a cation living polymerization catalyst.

More specifically, a free-radical polymerization using an organic peroxide catalyst, and a cation polymerization using $BF_3$ or $PF_6$ can be performed. When a polymer having a high molecular weight and a small molecular weight distribution, and thus, exhibiting enhanced mechanical strengths is desired, a polymerization is preferably performed by using an organic alkali metal compound catalyst in a hydrocarbon medium.

The type of polymerization is not particularly limited, and includes, for example, bulk polymerization, emulsion polymerization, suspension polymerization and solution polymerization.

After the completion of polymerization, the polymer can be recovered by a known method which includes, for example, a steam stripping method, a direct desolvation method and a method of coagulation with an alcohol. When the polymerization is carried out by using a catalyst inert to a hydrogenation reaction, a polymer liquid as obtained by polymerization can be used, as it is, without recovery of the polymer for the step of hydrogenation of the polymer.

The hydrogenation of the polymer can be carried out by a conventional procedure. However, to enhance the hydrogenation efficiency and minimize the polymer chain scission, the hydrogenation is preferably carried out in an organic solvent by using a hydrogenation catalyst containing at least one metal selected from nickel, cobalt, iron, titanium, rhodium, palladium, platinum, ruthenium and rhenium. Of these hydrogenation catalyst, a nickel catalyst is especially preferable because Mw/Mn of the polymer can be rendered small. The hydrogenation catalyst may be either a heterogeneous catalyst or a homogeneous catalyst. The hydrogenation reaction is performed at a temperature of usually 10° C. to 25° C., preferably 50° C. to 200° C. and more preferably 80° C. to 180° C., and at a hydrogen pressure of usually 1 to 300 $kg/cm^2$, preferably 5 to 250 $kg/cm^2$ and more preferably 10 to 200 $kg/cm^2$.

The hydrogenation percentage of the hydrogenated polymer is usually at least 80%, preferably at least 90% and more preferably at least 95%.

As examples of the vinyl alicyclic hydrocarbon polymer, there can be mentioned (i) a hydrogenation product of a vinyl aromatic polymer, and (ii) vinylcycloalkane polymer and vinylcycloalkene polymer, and hydrogenation products thereof. As the vinylcycloalkane and vinylcycloalkene, vinylcyclohexanes and vinylcyclohexenes are preferable, respectively, in view of the low birefringence and high mechanical strengths.

Additives

According to the need, various additives can be incorporated with the vinyl alicyclic hydrocarbon polymer. The additives include, an antioxidant, an ultraviolet absorber, a light stabilizer and an antistatic agent.

As examples of the antioxidant, there can be mentioned phenolic antioxidants, phosphorus-containing antioxidants and sulfur-containing antioxidants. Of these, phenolic antioxidants are preferable. An alkyl-substituted phenolic antioxidants are especially preferable. By the incorporation of these antioxidants, coloration and strength reduction of polymer due to oxidative degradation can be prevented or minimized without deterioration of transparency and while a low water absorption is kept.

The amount of an antioxidant is appropriately chosen within the range in which the object of the invention is achieved, and it is usually in the range of 0.001 to 5 parts by weight, preferably 0.01 to 1 part by weight, based on 100 parts by weight of the polymer.

To prevent the polymer from becoming white-opaque when it is maintained under high-temperature and high-humidity conditions for a long period of time, without deterioration of transparency, low water absorption and mechanical strengths, the vinyl alicyclic hydrocarbon polymer can be incorporated with at least one ingredient selected from (1) a soft polymer, (2) an alcoholic compound and (3) an organic or inorganic filler. Of these, (1) a soft polymer and (2) an alcoholic compound are preferable because the effect of preventing the polymer from becoming white-opaque under high-temperature high-humidity conditions is large.

(1) Soft Polymer

The soft polymer (1) has usually a glass transition temperature (Tg) of not higher than 30° C. If the polymer has two or more glass transition temperatures (Tg), it is preferable that the lowest Tg is not higher than 30° C.

As specific examples of the soft polymer, there can be mentioned soft olefin polymers such as liquid polyethylene, polypropylene, poly-1-butene, an ethylene-α-olefin copolymer, a propylene-α-olefin copolymer, an ethylene-propylene-diene copolymer (EPDM) and an ethylene-propylene-styrene copolymer; soft isobutylene polymers such as polyisobutylene, an isobutylene-isoprene rubber and an isobutylene-styrene copolymer; soft diene polymers such as polybutadiene, polyisoprene, a butadiene-styrene random copolymer, an isoprene-styrene random copolymer, an acrylonitrile-butadiene copolymer, an acrylonitrile-butadiene-styrene copolymer, a butadiene-styrene block copolymer, a styrene-butadiene-styrene block copolymer, an isoprene-styrene block copolymer and a styrene-isoprene-styrene block copolymer; silicon-containing soft polymers such as dimethylpolysiloxane, diphenylpolysiloxane and dihydroxypolysiloxane; soft α,β-unsaturated acid polymers such as polybutyl acrylate, polybutyl methacrylate, polyhydroxyethyl methacrylate, polyacrylamide, polyacrylonitrile and a butyl acrylate-styrene copolymer; soft polymers of an unsaturated alcohol or an amino or acyl derivatives thereof or acetals thereof, such as polyvinyl alcohol, polyvinyl acetate, polyvinyl stearate and a vinyl acetate-styrene copolymer; epoxy group-containing soft polymers such as polyethylene oxide, polypropylene oxide and epichlorohydrin rubber; fluorine-containing soft polymers such as vinylidene fluoride rubbers and teterafluoroethylene-propylene rubber; and natural rubber, polypeptide, protein, a thermoplastic polyester elastomer, a thermoplastic vinyl chloride elastomer and a thermoplastic polyamide elastomer. These soft polymers may have a crosslinked structure, or a functional group introduced by a modification reaction.

Among the above-recited soft polymers, soft diene polymers are preferable. A hydrogenation product prepared by hydrogenating the carbon-carbon unsaturation of a soft diene polymer is especially preferable in view of the rubber elasticity, mechanical strengths, softness and dispersibility, (2) Alcoholic Compound An alcoholic compound is a compound having at least one non-phenolic hydroxyl group in the molecule, and preferably having at least one non-phenolic hydroxyl group and at least one ether bond or ester bond in the molecule.

The alcoholic compound includes, for example, polyhydric alcohols, preferably trihydric or more-hydric alcohols, and more preferably alcoholic ether compounds and alcohlic ester compounds, which are prepared by etherifying or esterifying at least one hydroxyl group of a polyhydric alcohol having 3 to 8 hydroxyl groups.

As specific examples of the polyhydric alcohols, there can be mentioned polyethylene glycol, glycerol, trimethylolpropane, pentaerythritol, diglycerol, triglycerol, dipentaerythritol, 1,6,7-trihydroxy-2,2-dihydroxymethyl)-4-oxoheptane, sorbitol, 2-methyl-1,6,7-trihydroxy-2-hydroxymethyl-4-oxoheptane, 1,5,6-trihydroxy-3-oxohexanepentaerythritol and tris(2-hydroxyethyl) isocyanurate. Trihydric or more-hydric alcohols, especially polyhydric alcohols having 3 to 8 non-phenolic hydroxyl groups are preferable. When an alcoholic ester compound is prepared, polyhydric alcohols capable of forming an alcoholic ester compound containing α,β-diol are preferable, which includes, for example, glycerol, diglycerol and triglycerol.

As specific examples of the alcoholic compound, there can be mentioned polyhydric-alcoholic ester compounds such as glycerin monostearate, glycerin monolaurate, glycerin monobehenate, diglycerin monostearate, glycerin distearate, glycerin dilaurate, pentaerythritol monostearate, pentaerythritol monolaurate, pentaerythritol monobehenate, pentaerythritol distearate, pentaerythritol dilaurate, pentaerythritol tristearate and dipentaerythritol distearate; and polyhydric-alcoholic ether compounds such as 3-(octyloxy)-1,2-propanediol, 3-(decyloxy)-1,2-propanediol, 3-(lauryloxy)-1,2-propanediol, 3-(4-nonylphenyloxy)-1,2-propanediol, 1,6-dihydroxy-2,2-di(hydroxymethyl)-7-(4-nonylphenyloxy)-4-oxoheptane, an alcoholic ether compound prepared by reaction of a condensate of p-nonylphenylether with formaldehyde, with glycidol, an alcoholic ether compound prepared by reaction of a condensate of p-octylphenylether with formaldehyde, with glycidol, and an alcoholic ether compound prepared by reaction of a condensate of p-octylphenylether with dicyclopentadiene, with glycidol. These polyhydric alcoholic compounds may be used either alone or as a combination of at least two thereof.

The molecular weight of these polyhydric alcoholic compounds is not particularly limited, but is, usually in the range of 500 to 2,000, preferably 800 to 1,500 because the reduction of transparency is minor.

(3) Organic or Inorganic Filler

The organic filler includes ordinary organic polymer particles and crosslinked organic polymer particles. As specific examples of the organic filler, there can be mentioned particles and crosslinked particles of: polyolefins such as polyethylene and polypropylene; polymers of $\alpha,\beta$-unsaturated carboxylic acid or its derivatives such as polyarylate and polymethacrylate; polyvinyl acetate and polyvinyl alcohol; polyethylene oxide and a polymer derived from bisglycidyl ether; aromatic ring-containing polycondensates such as polyphenylene oxide, polycarbonate and polysulfone; polyurethane; polyamide; polyester; phenolformaldhyde resin; and natural high-molecular-weight compounds.

As specific examples of the inorganic filler, there can be mentioned particles of: compounds of element of group 1 (in this paragraph, "group" means group of the periodic table) such as lithium fluoride and borax (sodium hydrate hydrate); compounds of element of group 2 as magnesium carbonate, magnesium phosphate, calcium carbonate, strontium titanate and barium carbonate; compounds of element of group 4 such as titanium dioxide (titania) and titanium monooxide; compounds of element of group 6 such as molybdenum dioxide and molybdenum trioxide; compounds of element of group 7 such as manganese chloride and manganese acetate; compounds of element of group 8–10 such as cobalt chloride and cobalt acetate; compounds of element of group 11 such as cuprous iodide; compounds of element of group 12 such as zinc oxide and zinc acetate; compounds of element of group 13 such as aluminum oxide (alumina), aluminum fluoride and aluminosilicate (including alumina silicate, kaolin and kaolinite); compounds of element of group 14 such as silicon oxide (including silica and silica gel), plumbago, carbon, graphite and glass; and natural minerals such as carnallite, kainite, mica, phlogopite and byrooe ore.

The amount of the ingredients (1) to (3) is usually in the range of 0.01 to 10 parts by weight, preferably 0.02 to 5 parts by weight and more preferably 0.05 to 2 parts by weight, based on 100 parts by weight of the polymer. If the amount of ingredients (1) to (3) is too small, the effect of preventing the polymer from becoming white-opaque under high-temperature high-humidity conditions cannot be obtained. In contrast, if the amount of ingredients (1) to (3) is too large, the shaped articles have poor heat resistance and transparency.

Laminating Disc
Supporting Disc

The laminated disc of the invention is composed of at least two supporting discs superposed upon another, each of which is made by molding the above-mentioned vinyl alicyclic hydrocarbon polymer. Usually a recording layer is formed on a surface of each supporting disc, which surface is placed in contact with a surface of the adjacent supporting disc. The laminated disc having recording layers formed on supporting discs is used as a information recording medium.

The supporting discs are made by a shaping method such as an injection molding, an extrusion shaping, a press-molding method and a casting method. Of these shaping methods, an injection molding method in preferable because the disc exhibits a small birefringence and a reduced warp and has high mechanical strengths.

More specifically the supporting discs are injection-molded by a method wherein a molding material comprised of the vinyl alicyclic hydrocarbon polymer is heated to be molten, for example, by a heating cylinder, the molten material is injected into a cavity of a mold, and then the molten material is cooled to be thereby solidified within the mold. A stamper is provided on the inner surface of the mold, and a pit and a groove are formed on the molded article by the stamper.

The molding conditions are not particularly limited, but the temperature of a cylinder of the molding machine is usually in the range of 200 to 400° C., preferably 220 to 380° C. and more preferably 240 to 360° C., and the mold temperature is preferably in the range of 50 to 180° C. When the temperatures are too low, transferring of the molding surface is reduced and the birefringence becomes large. In contrast, when the temperatures are too high, the degradation of a polymer tends to occur, which leads to reduction of the mechanical strengths of discs.

At the injection molding, when the rate of injection is high, an orientation is given to the surface layer of disc and the mechanical strengths are enhanced. But, too high rate of injection should be avoided because of the birefringence becomes undesirably large. A suitable rate of injection can be determined depending upon the L/D of a screw of the injection molding machine, the mold temperature, the volume of disc, and the cross-sectional area of a gate, while birefringence, initial warp, weldline, flowmark, and molding sink and burr are considered. The rate of injection (cm³/sec) is calculated as a product of the cross-sectional area of screw (cm²) with the speed of injection (cm/sec), and is in proportional to the flow rate of polymer. The rate of injection is usually in the range of 10 to 10,000 cm³/sec, preferably 50 to 5,000 cm³/sec, and more preferably 100 to 3,000 cm³/sec. If the rate of injection is too small, short-shot occurs. In contrast, if the rate of injection is too large, shear heat build-up occurs to a large extent, and the polymer is liable to be degraded.

The dimension of the disc are determined according the standard for a recording medium. The thickness of disc is usually in the range of 0.01 to 1 mm, preferably 0.3 to 0.8 mm and more preferably 0.4 to 0.7 mm. When the thickness is within this range, the birefringence is reduced to the desired extent. In the case of an optical disc, when two thin discs are bonded together for making the disc, the birefringence of the laminated disc is generally apt to become large. In contrast, according to the present invention, even when two or more thin discs are bonded together, a laminated disc having a low birefringence is easily obtained. Therefore, the laminated disc of the present invention is suitable for an optical disc, such as DVD, made by bonding together two or more thin discs. The diameter of the disc is usually in the range of 30 mm to 300 mm.

Recording Layer

By bonding together at least two thin supporting discs, each having a recording layer on a surface thereof, the resulting laminated disc can be used as an information recording medium. The recording layer is formed on a surface of the supporting disc by forming a reflection metal film such as aluminum or nickel, and/or an organic or inorganic film capable of locally varying light reflection in a reversible or irreversible manner. The thickness of the recording layer is usually in the range of several hundred angstrom to several thousands angstrom. The maximum permissible thickness is usually about 10,000 angstrom.

The light transmittance of the supporting discs at a wavelength of 780 nm is usually at least 80%, preferably at least 83% and more preferably at least 85%.

The water absorption of the supporting discs is usually not larger than 0.5%, preferably not larger than 0.2% and more preferably not larger than 0.1%.

The birefringence of the supporting discs is usually not larger than 100 nm, preferably not larger than 80 nm and more preferably not larger than 50 nm.

For CD, CD-ROM and DVD-ROM, an information to be recorded is cut into the surface of a stamper portion of a mold for injection molding, and the resulting disc has minute grooves formed on the surface thereof, which correspond to the information in the stamper portion. Thus, by forming a reflection film layer composed of aluminum or gold on the surface including the grooves, a recording film layer comprising the grooves and the reflection film layer is constituted.

For writable CD-R and write-and-erazable photomagnetic disc (MO), a recording film layer capable of reversibly or irreversibly varying the light reflection or light transmittance, a reflection film layer for reflecting light, and a thin inorganic or organic protective layer for protecting the recording film layer and the reflection film layer, and correcting an optical strain. Each of the recording film layer, the reflection film layer and the protective layer is constituted as a single layer or as a multi-layer composed of at least two thereof.

The recording film layer, the reflection film layer and the protective layer can be formed by a method of sputtering, vapor phase growth or chemical coating. For example, for a photomagnetic disc, a reflection film layer composed of aluminum, gold or an alloy thereof, and a thin protective film layer composed of SiN or SiC are formed on a photomagnetic recording medium, for example, composed of Tb—Fe—CO or Pt—Tb—Fe—Co whereby an information recording layer is constituted. For a phase-changeable disc, the above-mentioned reflection film layer and thin protective film layer are formed on a recording medium composed of Te—Ge—Sb, In—Sb—Te, Te—Ge—Cr or Te—Ge—Zn whereby an information recording layer is constituted.

The thickness and the method for constituting an information recording layer vary depending upon the particular kind of disc-shaped information recording medium. The information recording layer may be constituted by the conventional method according to the standard required.

When a laminated disc having the above-mentioned recording layer on the bonded surface of the adjacent supporting discs is made, a bonding procedure can be employed which is selected from (1) a procedure of bonding a disc (a) having the above-mentioned recording layer together with a disc (b) having no recording layer so that the recording layer is located on the bonded surface, and (2) a procedure of bonding together two of the disc (a) so that the recording layer of each disc confront to each other. Of these, procedure (b) is preferable because of the relative amount of the recording layer is large.

The bonding procedure includes, for example, a heat-fusion bonding, ultrasonic fusion bonding, and bonding with an adhesive. Of these, the bonding with an adhesive is preferable because of enhanced adhesion strength and productivity.

As examples of the adhesive, there can be mentioned a hot-melt adhesive, a heat-curable adhesive, a radiation curable adhesive, a solvent-volatilizable adhesive, anaerobically curable adhesive and self-adhesive sheet. A heat-curable adhesive, a radiation curable adhesive and self-adhesive sheet are preferable in view of productivity. A radiation curable adhesive and self-adhesive sheet are especially preferable in view of optical characteristics including light transmittance. The radiation curable adhesive includes, for example, an electron radiation curing adhesive and an ultraviolet radiation curing adhesive. Especially an ultraviolet radiation curing adhesive is preferable in view of productivity and equipment. As examples of the ultraviolet radiation curable adhesive, a free-radical-polymerizable ultraviolet curable adhesive, a cation-polymerizable ultraviolet-curable adhesive and free-radical/cation-polymerizable ultraviolet radiation curable adhesive.

As a preferable specific example of the radiation curable adhesive, there can be mentioned a free-radical-polymerizable ultraviolet radiation curable adhesive comprising an acrylate polymer and a photopolymerizable initiator, and an optional other polymer.

The acrylate polymer used includes, for example, an alicyclic acrylate and chainlike aliphatic monofunctional acrylate. Oligomers of these monomers can also be used. The alicyclic acrylate is a monomer or oligomer of an acrylate having an alicycclic structure and an acrylate group directly bonded to the structure. The alicyclic structure may have a substituent, which is preferably free from elements other than carbon and hydrogen. More specifically the alicyclic acrylate is an ester formed from an alicyclic alcohol and acrylic acid or methacrylic acid. The alicyclic acrylate may be a monofunctional acrylate or a polyfunctional (i.e., bi- or more functional) acrylate. A polyfunctional acrylate is especially preferable in view of heat resistance and crosslink density.

As specific examples of the alicyclic acrylate, there can be mentioned cyclohexyl acrylate, norbornyl acrylate, dicyclopentanyl acrylate, dicyclopentenyl acrylate, isobornyl acrylate, hexacyclo[6,6,1,1$^{3.6}$,1$^{10.13}$,0$^{2.7}$,0$^{9.14}$]heptadecyl-4-acrlate, 12-methylhexacyclo[6,6,1,1$^{3.6}$,1$^{10.13}$,0$^{2.7}$,0$^{9.14}$]-heptadecyl-4-acrlate, octacyclo-[8,8,0,1$^{2.9}$,1$^{4.7}$,1$^{11.18}$,1$^{13.16}$, 0$^{3.8}$,0$^{12.17}$]docosyl-5-acrylate, tetracyclo[4,4,0,1$^{2.5}$,1$^{7.10}$] dodecyl-3-acrylate and 9-stearyl-tetracyclo[4,4,0,1$^{2.5}$,1$^{7.10}$] dodecyl-3-acrylate. An alicyclic acrylate oligomer is obtained by pre-polymerizing an alicyclic acrylate monomer by the conventional method to a polymerization degree of 2 to about 100.

The chainlike aliphatic monofunctional acrylate comprises an aliphatic chain portion and an acrylate group. The aliphatic chain portion preferably has 5 to 18 carbon atoms, more preferably 8 to 16 carbon atoms. When the carbon number is too small, the adhesion strength is poor. In contrast, when the carbon number is too large, the crosslink density is low, the strength is low, and the viscosity increases and thus the handling properties become poor. As specific examples of the chainlike aliphatic monofunctional acrylate, there can be mentioned lauryl acrylate, stearyl acrylate, octyl acrylate, isooctyl acrylate, decyl acrylate and iosdecyl acrylate.

The polymer optionally incorporated with the adhesive is not particularly limited provided that the polymer enhances the heat resistance and mechanical strengths. The polymer preferably has a number average molecular weight (Mn) of at least about 10,000, more preferably at least about 30,000 and especially preferably at least about 40,000. The number average molecular weight (Mn) is preferably not more than about 400,000, preferably not more than about 300,000 and especially preferably not more than about 200,000. If Mn is too small, the mechanical strengths are poor. In contrast, if Mn is too large, the solubility becomes poor and the production is difficult.

The optional polymer includes, for example, styrene block copolymers and modified products thereof. As specific examples of the styrene block copolymer, there can be mentioned a styrene-butadiene-styrene block copolymer, a styrene-isoprene-styrene block copolymer, a styrene-isoprene-pentadiene-styrene block copolymer, and hydrogenation products of these block copolymers. As specific examples of the modified products of styrene block copolymers, there can be mentioned products prepared by modifying the styrene block copolymers with dicarboxylic acid anhydride or an epoxy compound, and halogenated products of the styrene block copolymers.

These polymers preferably have a highest glass transition temperature, as measured by DSC, of at least 50° C., and more preferably at least 60° C.

The photopolymerization initiator used for a radiation curable adhesive is not particularly limited, and may be conventional. As specific examples of the photopolymerizable initiator, there can be mentioned acetophenones such as 2,2-dimethoxy-2-phenylacetophenone, 2 2-diethoxyacetophenone and 2-methyl-1-(4-methylthiophenyl)-2-morpholino-propan-1-one; benzoins such as benzyl, methylorthobenzoyl benzoate, benzoin methyl ether and benzoin ethyl ether; benzyl dimethyl ketals; and α-hydroxyketones.

The radiation curable adhesive composition usually comprises (a) an alicyclic acrylate and/or chainlike aliphatic monofunctional acrylate, (b) a polymer ingredient and (c) a photopolymerization initiator. The amount of (b) is, based 100 parts by weight of (a), usually at least 0.1. part by weight, preferably at least 1 part by weight and more preferably at least 3 part by weight, and usually not larger than 100 parts by weight, preferably not larger than 50 parts by weight and more preferably not larger than 30 parts by weight. The amount of (c) is, based 100 parts by weight of (a), usually at least 1 part by weight, preferably at least 2 part by weight and more preferably at least 3 part by weight, and usually not larger than 30 parts by weight and preferably not larger than 25 parts by weight.

If the amount of (b) is too small, the adhesive has poor flexibility after curing, and thus, it is liable to be peeled from the supporting disc and the physical properties of the laminated disc are deteriorated at a high temperature. In contrast, if the amount of (b) is too large, the viscosity of the adhesive exhibits a high viscosity and the coating workability becomes poor. If the amount of (c) is too small, the rate of curing is lowered. In contrast, if the amount of (c) is too large, the cured product exhibits a reduced number average molecular weight and the adhesion strength is reduced.

According to the need, various ingredients can be incorporated in the above-mentioned adhesive composition provided that the effect of the invention is obtainable. The ingredients include, for example, acrylate monomers and acrylate oligomers, other than the above-mentioned acrylate monomers and acrylate oligomers; additives such as an antioxidant, a thermal polymerization inhibitor, an curing accelerator, an ultraviolet absorber, an antistatic agent, a leveling agent, an anti-foaming agent and a colorant; and inorganic fillers such as talc and silica.

The adhesive composition can be applied by the conventional methods, which include, for example, spin coating, gravure coating, spray coating and dipping. These methods may be used either alone or in combination. A spin coating method is preferable in view of the productivity and the controllability of coating thickness. The coating conditions can be appropriately determined depending upon the viscosity of adhesive, the intended coating thickness and other factors.

The intensity of ultraviolet irradiation for curing the adhesive is usually at least 50 mW/cm$^2$ and the dosage of ultraviolet rays is usually in the range of 500 to 2,000 mJ/cm$^2$. The light source includes, for example, a high-pressure mercury lamp and a metal halide lamp, The cured adhesive layer usually has a thickness of 10 to 200 μm, preferably 30 to 100 μm. If the thickness of the adhesive layer is too small, an adhesive layer having a uniform thickness is difficult to form, and the resulting adhesive layer has poor durability. In contrast, if the thickness of the adhesive layer, the disc is apt to warp due to shrinkage upon curing.

The laminated disc, made by the above-mentioned method, usually has a thickness of 0.6 to 2 mm, preferably 0.6 to 1.5 mm and more preferably 1.0 to 1.3 mm in view of the impact resistance and the signal-reading performance.

To enhance impact resistance of the laminated disc, a hub is preferably fitted to one or both surfaces of the laminated disc. A hub is fitted to the central holed part of the disc. The hub usually contains a magnetic material so that the magnetic hub-fitted disc is magnetically fixed to a turn table of a drive. The hub is made by (i) a method of cutting a plate of magnetic metal into a disc-form with a central hole, (ii) a method of insert molding a resin disc-form plate having an insert of magnetic metal plate, and (iii) a method of molding a resin composition having incorporated therein a powdery magnetic material into a disc-form.

The fitting of the hub to the disc is effected usually by partial ultrasonic welding or application of an adhesive. The shape of hub is not particularly limited provided that the information reading of an optical disc and information writing on the optical disc are not injured, but the shape of hub should not be such that the information recording area of the optical disc is narrowed to a great extent, or the optical disc is eccentrically rotated when the disc is mounted on a drive. More specifically the hub preferably has a cylindrical form with a dimension such that the outer peripheral thereof does not reach the information recording area of the inner circular part of the disc, or the hub preferably has a stair cyclindrical form having a cylindrically projecting central portion to be inserted in the central hole of the disc. The hub usually has a thickness of about 0.2 to about 3 mm and a diameter of about 10 to about 30 mm.

Information Recording Medium

The laminated disc of the invention is used as an information recording medium, and especially suitable for an optically readable information recording medium. As examples of the information recording medium, there can be mentioned those which are incapable of being written nor erased and utilize the change of reflected light due to minute undulation, such as music CD, CD-ROM and laser disc; and those which are writable or writable-and-erasable and utilize the change of reflection due to the phase change or organoleptic dye, such as CD-R, WORM (writable optical disc), MO (writable-and-erasable optical disc, photomagnetic disc), MD (mini-disc) and DVD (digital video disc).

The invention will now be specifically described by the following working examples. In these examples, % and parts are by weight unless otherwise specified.

Properties of polymers and optical discs, and hydrogenation percentage of aromatic ring were evaluated by the following methods.

(i) Molecular Weight

Molecular weight was measured by GPC using toluene as solvent, and weight average molecular weight (Mw) as expressed in terms of standard polystyrene was determined.

(ii) Molecular Weight Distribution

Molecular weight was measured by GPC using toluene as solvent, and number average molecular weight (Mn) and weight average molecular weight (Mw) as expressed in terms of standard polystyrene were determined. The molecular weight distribution was expressed by the ratio of Mw/Mn.

(iii) Hydrogenation Percentage of Aromatic Ring

Hydrogenation percentage of aromatic ring at the step of preparing a vinyl alicyclic hydrocarbon polymer was determined by $^1$H-NMR measurement.

(iv) Birefringence of Optical Disc

Birefringence was measured at a location of 25 mm apart from the center of an optical disc having a diameter of 85 mm. The measurement was carried out by a polarizing microscope (supplied by Nikon: 546 nm Senarmon compensator).

(v) Impact Resistance of Optical Disc

A groove having a width of 75 mm and a depth of 50 mm was cut in a wooden base having a size of 200 mm×200 mm×100 mm (height). A disc specimen was placed on the wooden disc in a manner such that the center of the disc is positioned on a center line of the groove. A weight of 3,000 g was loaded on a central portion of the disc having a hole at the center, and the change of appearance of the disc surface, i.e., occurrence of cracks due to warp of the disc was observed. The test results are expressed by the number of discs on which cracks occur, when the test is carried out on ten disc specimens.

(vi) Warp of Optical Disc

A disc specimen is allowed to stand for 24 hours under environmental conditions of 70° C. and 90% humidity, and then, a warp angle is measured. The following four ratings are assigned.

Rating 1: warp angle is not larger than 3 mm rad

Rating 2: warp angle is larger than 3 mm rad and not larger than 5 mm rad

Rating 3: warp angle is larger then 5 mm rad and not larger than 8 mm rad

Rating 4: warp angle is larger than 8 mm rad

Production Example 1
(Production of Hydrogenation Product A of Vinyl Aromatic Polymer)

A stainless steel reactor equipped with a stirrer was thoroughly dried and flushed with nitrogen. The reactor was charged with 960 parts of dehydrated cyclohexane, 240 parts of a styrene monomer and 3.81 of dibutyl ether, and, while the content was stirred at 40° C., 0.65 part of a solution containing 15% of n-butyllithium in hexane was added to initiate polymerizartion. The polymerization was carried out under the same conditions for 3 hours, and 1.26 parts of isopropyl alcohol was added to stop the polymerization.

The weight average molecular weight (Mw) and number average molecular weight (Mn) of the thus-prepared vinyl aromatic polymer (a) (i.e., polystyrene) were measured. Mw was 180 000 and Mw/Mn was 1.04.

A pressure-resistant reactor equipped with a stirrer was charged with 1,200 parts of the as-polymerized polymer solution containing the vinyl aromatic polymer (a), and then, 24 parts of nickel-diatomaceous earth catalyst (nickel content: 40%: N-113 supplied by JGC Corp.) was added. After completion of charging, the inside of the reactor was substituted by hydrogen gas, and hydrogen gas was fed at 150° C. with stirring so that the pressure was maintained at 70 kg/cm$^2$, thus carrying out a hydrogenation reaction for 6 hours. After completion of the hydrogenation reaction, the reaction solution was filtered to remove the hydrogenation catalyst. The filtrate was diluted with 1,200 parts of cyclohexane, and the diluted filtrate was filtered by a filter having perforations with 1 µm diameter to remove foreign matter under an environment with a clean degree of class 1000. Then, under an environment with a clean degree of class 1000, the filtrate was put in 9,000 parts of isopropanol, which had previously been filtered by a filter having perforations with 1 µm diameter, to precipitate a hydrogenation product A of vinyl aromatic polymer (a). The hydrogenation product A was filtered and the thus-separated solid was dried at 100° C. for 45 hours by a vacuum drier to recover the hydrogenation product A of vinyl aromatic polymer (a). The hydrogenation product A had an Mw of 153,000 and an Mw/Mn of 1.09.

Production Example 2
(Production of Hydrogenation Product B of Vinyl Aromatic Polymer)

A vinyl aromatic polymer (b) was prepared by the same procedure as described in Production Example 1 except that 0.1 part of azobisisobutyronitrile was added instead of the dibutyl ether and the n-butyllithium solution to initiate polymerization, and the polymerization was carried out at 60° C. for 48 hours. The vinyl aromatic polymer (b) had an Mw of 195,000 and an Mw/Mn of 1.80.

Hydrogenation of the vinyl aromatic polymer (b) was carried out by the same procedure as described in Production Example 1 except that 72 parts of ruthenium-carbon catalyst (Ruthenium content: 5%, supplied by N.E.Chemcat Co.) was used, and the hygrogenation reaction was carried out at 170° C. for 10 hours. The thus-obtained hydrogenation product B exhibited an Mw of 79,000 and an Mw/Mn of 1.65.

EXAMPLE 1
Molding for Optical Disc

To 100 parts of the hydrogenation product A of the vinyl aromatic polymer (a), prepared in Production Example 1, 0.1 part of a soft polymer (Tuftec H1052 supplied by Asahi Chem. Ind.) and 0.1 part of an antioxidant (Irganox 1010 supplied by Ciba-Geigy) were added, and the mixture was kneaded by a twin-screw extruder (TEM-35B supplied by Toshiba Machine; screw diameter: 37 mm, L/D: 32. screw revolution: 150 rpm, polymer temperature: 240° C., feed rate 15 kg/hour) to be extruded into a strand. The strand was cooled with water and out by a pelletizer into a pellet.

The pellet was dried at 70° C. for 2 hours by a hot-air dryer through which hot-air stream was flown, to remove moisture. The dried pellet was injection molded by an injection molding machine (DISC-3 supplied by Sumitomo Heavy Ind.) equipped with a mold having a stamper for optical disc, at a polymer temperature of 330° C., mold temperature of 100° C. and an injection rate of 1,200 cm$^3$/sec. to obtain an optical disc having a thickness of 0.6 mm, a diameter of 85 mm and a central hole diameter of 15 mm. A pit for information signal was formed on one surface of the disc.

Formation of Reflection Film Layer

An aluminum reflection film layer with a thickness of 80 nm was formed on the pit-formed surface of the disc by ILC-3000 supplied by Nichiden Anelva). However, the reflection film layer was not formed on the outer peripheral edge having a width of 0.2 mm, and on the inner circular region having a width of 12 mm located inside the innermost groove.

Fabrication of Laminated Disc

Two discs each having a reflection film layer were laminated together by using an ultraviolet (UV) curable adhesive, and the laminated disc was irradiated with ultraviolet rays at a dosage of 2,500 mJ/cm$^2$ to obtain a laminated optical disc.

The UV curable adhesive used consisted of the following ingredients: 90 parts of dicyclopentadienyl acrylate (FA513A supplied by Hitachi Chem.), 10 parts of isobornyl acrylate (IB-XA supplied by Kyoeisha Chem.) 5 parts of a styrene-ethylene-butadiene-styrene block copolymer (Tuftec 1052 supplied by Ashai Chem. Ind.), and 8 parts of a photopolymerization initiator (Irgacure 184 supplied by Ciba Speciality Chem.).

The birefringence, impact resistance and warp angle were evaluated. The results are shown in Table 1.

EXAMPLE 2

A laminated optical disc was fabricated and evaluated by the same procedures as described in Example 1 wherein the injection rate was changed to 500 cm³/sec with all other conditions remaining the same. The evaluation results are shown in Table 1.

EXAMPLE 3

A laminated optical disc was fabricated and evaluated by the same procedures as described in Example 2 wherein a hub with a central hole for mounting onto a drive, having a diameter of 23 mm and a thickness of 2.5 mm, was fitted to the central part of the disc by ultrasonic fusion with all other conditions remaining the same. The evaluation results are shown in Table 1.

EXAMPLE 4

A laminated optical disc was fabricated and evaluated by the same procedures as described in Example 2 wherein, instead of the UV curable adhesive used in Example 2, Dicure Clear SD-661 (supplied by Dainippon Ink and Chem.) was used with all other conditions remaining the same. The evaluation results are shown in Table 1.

EXAMPLE 5

A laminated optical disc was fabricated and evaluated by the same procedures as described in Example 4 wherein the hydrogenation product B prepared in Production Example 2 was used instead of the hydrogenation product A prepared in Production Example 1 with all other conditions remaining the same. The evaluation results are shown in Table 1.

Comparative Example 1

A disc having a pit formed thereon was made by the same procedure as described in Example 1 except that the optical disc had a thickness of 1.2 mm instead of 0.6 mm. A reflection film layer was formed on the disc in the manner as described in Example 1. An ultraviolet curable protective coating composition (SD-17 supplied by Dainippon Ink and Chem.) was coated on the reflection film layer of the disc by a spin coater, and the coating was dried. The dried coating had a thickness of 10 µm. The coated disc was irradiated with ultraviolet rays by using a high-pressure mercury lamp at 150 mW/cm² under the following conditions: peak irradiation intensity on the disc surface: 150 mW/cm², integrated amount of light: 1,500, irradiation time: 10 sec) to cure the UV curable protective coating composition to obtain an optical disc having a protective coating layer.

The properties of the thus-obtained optical disc were evaluated. The evaluation results are shown in Table 1.

Comparative Example 2

An optical disc was made and evaluated by the same procedures as described in Comparative Example 1 wherein the injection rate in the injection molding for the disc with a thickness of 1.2 was changed to 500 cm³/sec with all other conditions remaining the same. The evaluation results are shown in Table 1.

Comparative Example 3

An optical disc was made and evaluated by the same procedures as described in Comparative Example 2 wherein the same hub as used in Example 3 was fitted to the disc in the same manner as in Example 3 with all other conditions remaining the same. The evaluation results are shown in Table 1.

As seen from Table 1, the laminated disc of the invention has a low birefringence and a high impact resistance, and exhibits warp only to a negligible extent. This laminated disc is used as an optical disc and especially suitable for a high-density high-capacity optical disc such as digital video disc (DVD).

TABLE 1

|  | Examples | | | | | Comparative Examples | | |
|---|---|---|---|---|---|---|---|---|
|  | 1 | 2 | 3 | 4 | 5 | 1 | 2 | 3 |
| Kind of polymer | A | A | A | A | B | A | A | A |
| Injection rate (cm³/sec) | 1,200 | 500 | 500 | 500 | 500 | 1,200 | 500 | 500 |
| Thickness of supporting disc (mm) | 0.6 | 0.6 | 0.6 | 0.6 | 0.6 | 1.2 | 1.2 | 1.2 |
| Laminated structure | 2 discs laminated | 2 discs laminated | 2 discs laminated | 2 discs laminated | 2 discs laminated | single disc | single disc | single disc |
| Kind of adhesive*1 | 1 | 1 | 1 | 2 | 2 | — | — | — |
| Hub | Not fitted | Not fitted | Fitted | Not fitted | Not fitted | Not fitted | Not fitted | Fitted |
| Impact resistance (Number of discs with cracks) | 0 | 1 | 0 | 3 | 5 | 7 | 9 | 5 |
| Warp (rating) | 2 | 1 | 1 | 1 | 1 | 4 | 3 | 3 |
| Birefringence | 0.3 | 0.2 | 0.2 | 0.2 | 0.2 | 0.8 | 0.4 | 0.4 |

*1 Adhesive:
1: dicyclopentadienyl acrylate + isobornyl acrylate + styrene/ethylene/butadiene/styrene block copolymer + photo-initiator
2: Commercially available Dicure Clear SD-661

What is claimed is:

1. A laminated disc composed of at least two supporting discs superposed upon another; each supporting disc having a thickness of 0.01 to 1 mm and being made of a vinyl alicyclic hydrocarbon polymer.

2. The laminated disc according to claim 1, wherein the superposed supporting discs are bonded together through an adhesive layer placed between the adjacent supporting discs.

3. The laminated disc according to claim 2, wherein the adhesive layer is composed of a radiation-cured adhesive or a adhesive sheet.

4. The laminated disc according to claim 1, wherein the vinyl alicyclic hydrocarbon polymer comprises repeating units represented by the following formula (1):

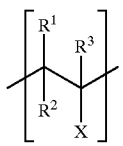

(1)

wherein X is an alicyclic hydrocarbon group; and $R^1$, $R^2$ and $R^3$ independently represent (i) a hydrogen atom, (ii) a hydrocarbon group selected from the group consisting of an alkyl group having 1 to 20 carbon atoms and an alkenyl group having 2 to 20 carbon atoms, (iii) a group selected from the group consisting of a halogen atom, an alkoxy group having 1 to 6 carbon atoms, a hydroxyl group, an ester group, a cyano group, an amide group, an imide group, a silyl group, or (iv) a hydrocarbon group having a polar group wherein the hydrocarbon group is selected from the group consisting of an alkyl group having 1 to 20 carbon atoms and an alkenyl group having 2 to 20 carbon atoms, and the polar group is selected from the group consisting of a halogen atom, an alkoxy group having 1 to 6 carbon atoms, a hydroxyl group, an ester group, a cyano group, an amide group, an imide group and a silyl group.

5. The laminated disc according to claim 1, wherein the vinyl alicyclic hydrocarbon polymer is an aromatic-ring-hydrogenation product of a vinyl aromatic polymer.

6. The laminated disc according to claim 1, wherein each supporting disc is an injection-molded article.

7. The laminated disc according to claim 1, wherein each supporting disc has a light transmittance at a wavelength of 780 nm of at least 80%.

8. The laminated disc according to claim 1, wherein each supporting disc has a water absorption of not larger than 0.5% by weight.

9. The laminated disc according to claim 1, wherein each supporting disc has a birefringence of not larger than 100 nm.

10. The laminated disc according to claim 1, wherein each supporting disc has a recording layer on a surface thereof.

11. The laminated disc according to claim 1, wherein the laminated disc has a hub.

12. The laminated disc according to claim 11, wherein the hub has a thickness of 0.2 to 3 mm and a diameter of 10 to 30 mm.

13. An information recording medium comprising the laminated disc as claimed in claim 1.

14. The information recording medium according to claim 13, which is a photomagnetic disc or a digital video disc.

15. The laminated disc according to claim 4, wherein the vinyl alicyclic hydrocarbon polymer is selected from the group consisting of (i) an aromatic-ring-hydrogenation product of a vinyl aromatic polymer, (ii) a vinylcycloalkane polymer, and (iii) a vinylcycloalkene polymer and a hydrogenation product thereof.

* * * * *